(12) United States Patent
Tsou et al.

(10) Patent No.: US 8,910,936 B2
(45) Date of Patent: Dec. 16, 2014

(54) BILL POSITION CORRECTION METHOD USING THE CHARACTERISTIC OF STEP LOSS OF STEP MOTOR

(71) Applicant: International Currency Technologies Corporation, Taipei (TW)

(72) Inventors: Ming-Hua Tsou, Taipei (TW); Shao-Kai Chang, Taipei (TW); Fong-Cheng Wei, Taipei (TW)

(73) Assignee: International Currency Technologies Corporation, Taipei (TW)

( * ) Notice: Subject to any disclaimer, the term of this patent is extended or adjusted under 35 U.S.C. 154(b) by 87 days.

(21) Appl. No.: 13/867,882

(22) Filed: Apr. 22, 2013

(65) Prior Publication Data

US 2014/0311860 A1    Oct. 23, 2014

(51) Int. Cl.
*B65H 7/02* (2006.01)
*B65G 47/24* (2006.01)

(52) U.S. Cl.
CPC .................................... *B65G 47/24* (2013.01)
USPC ............ 271/227; 271/226; 271/228; 198/395

(58) Field of Classification Search
USPC ................... 271/226, 227, 228; 198/395, 617
See application file for complete search history.

(56) References Cited

U.S. PATENT DOCUMENTS

| 4,201,464 | A  | * | 5/1980  | Botte et al. ..................... 399/382 |
| 4,971,304 | A  | * | 11/1990 | Lofthus ......................... 271/227 |
| 5,078,384 | A  | * | 1/1992  | Moore ........................... 271/228 |
| 5,219,159 | A  | * | 6/1993  | Malachowski et al. ........ 271/228 |
| 5,794,176 | A  | * | 8/1998  | Milillo .......................... 702/150 |
| 6,877,741 | B2 | * | 4/2005  | Polidoro et al. ............... 271/251 |
| 6,997,455 | B2 | * | 2/2006  | Romine ......................... 271/227 |
| 7,556,264 | B2 | * | 7/2009  | Polidoro et al. ............... 271/248 |
| 7,628,398 | B2 | * | 12/2009 | Elliot ............................ 271/228 |
| 7,631,866 | B2 | * | 12/2009 | Otomo et al. .................. 271/225 |
| 7,712,737 | B2 | * | 5/2010  | Elliot ............................ 271/228 |
| 8,746,692 | B2 | * | 6/2014  | Richards et al. ............... 271/228 |

* cited by examiner

*Primary Examiner* — Douglas Hess
(74) *Attorney, Agent, or Firm* — Muncy, Geissler, Olds & Lowe, P.C.

(57) ABSTRACT

When a bill is inserted into the bill acceptor, sensor components sense the insertion of bill, bill-pressing roller set of bill transmission mechanism is driven to press bill, bill-transfer roller set is driven to transfer bill the bill-pressing roller set is released from the bill, and step motors of alignment correction unit are controlled to move correction devices toward each other to align the bill with the center line of bill passage subject to a predetermined number of steps. If the resistance force from bill is larger than the thrust force produced during rotation of step motors, utilize the step loss status of step motors and enable transmission devices to move correction devices away from bill when the rotation of step motors reaches the predetermined number of steps, and then enable bill-pressing roller set to press bill again and then enable bill-transfer roller set to transfer bill.

6 Claims, 11 Drawing Sheets

BILL POSITION CORRECTION METHOD USING THE CHARACTERISTIC OF STEP LOSS OF STEP MOTOR

BACKGROUND OF THE INVENTION

1. Field of the Invention

The present invention relates to bill acceptor technology and more particularly, to a bill position correction method for correcting the position of an inserted bill in a bill acceptor by utilizing the characteristic of step loss of step motor.

2. Description of the Related Art

Following fast development of modern technology, people accelerate their pace of life and demand a better quality of life with more convenience and rapidness. Therefore, various automatic vending machines, automatic teller machines and bill acceptors are used in public places to sell different products or to provide different consumer services without serviceman. These automatic vending machines, automatic teller machines and bill acceptors are highly invited for the advantage of saving much labor and bringing convenience to people. Further, advanced automatic vending machines provide added functions.

However, counterfeit bills made by evil individuals are circulating in the market. To avoid receiving counterfeit bills, a bill acceptor generally provides a bill validator for validating the authenticity and value of an inserted bill before receiving it. Regular bill acceptors are commonly designed for receiving bills of a predetermined width. Further, different kinds of bills have different security features at different locations. An inserted bill must be kept in accurate alignment with the validator of the bill acceptor so that the validator can accurately validate the authenticity and value of the bill. If a bill is obliquely inserted into the bill slot of a bill acceptor, the inserted bill may deviate from accurate alignment with the validator, causing the validator not able to accurate recognize the security features of the bill. When this problem occurs, the bill acceptor will reject the inserted bill. Thus, the user must insert the bill again, causing inconvenience.

Further, many bill position correction designs have been created for use in a bill acceptor for correcting an inserted bill into an accurate alignment position. A known bill position correction design uses a motor to move two mechanical clamping arms at two opposite lateral sides of the bill passage to correct the position of a deviated bill being transferred by transmission roller sets, and sensors to detect a feedback resistance between the bill and the mechanical clamping arms. If the resistance reaches a predetermined value, the mechanical clamping arms are stopped. However, when a bill is inserted into a bill acceptor, the width and insertion direction of the bill are detected and the detected data is transferred to a control circuit for computing, determining the distance the two mechanical clamping arms to be moved by the motor. However, enhancing the accuracy of the movement of the motor-driven mechanical clamping arms complicates the circuit design of the control circuit and the related sensors, increasing the cost.

Therefore, it is desirable to provide a bill position correction means that eliminates the aforesaid problems.

SUMMARY OF THE INVENTION

The present invention has been accomplished under the circumstances in view. It is therefore one object of the present invention to provide a bill position correction method, which utilizes the characteristic of step loss of step motors to automatically correct an offset bill into accurate alignment with the center line of the bill passage. It is another object of the present invention, to provide a bill position correction method, which enables the structure of the bill acceptor to be simplified, reducing the cost of the bill acceptor.

To achieve these and other objects of the present invention, a bill position correction method is used in a bill acceptor in such a manner that when a bill is inserted into the bill acceptor, the sensor components of the sensor unit of the bill acceptor sense the insertion of the bill, and then the bill-pressing roller set of the bill transmission mechanism of the bill acceptor is driven to press the bill, and then the bill-transfer roller set of the bill transmission mechanism of the bill acceptor is driven to transfer the bill, the bill-pressing roller set of the bill transmission mechanism of the bill acceptor is released from the bill and then the step motors of the alignment correction unit of the bill acceptor are controlled to move respective correction devices toward each other in correcting bill into accurate alignment with the center line of the bill passage in the bill acceptor subject to a predetermined number of steps, and at the same time. IT the resistance force received by the correction devices from the bill is larger than the thrust force produced during rotation of the step motors to drive the transmission devices in moving the correction devices, utilize the step loss status of step motors to be unable to keep pushing bill, and then enable the transmission devices to move the correction devices away from the bill when the rotation of the step motors reaches the predetermined number of steps. Thereafter, enable the bill-pressing roller set to press the bill again, and then enable the bill-transfer roller set to transfer the bill. Thus, the bill acceptor in accordance with the present invention has the characteristics of simple structure, accurate bill alignment and low cost.

Further, if the resistance force received by the correction devices from the bill is larger than the thrust force (normally 4~8 g) produced during rotation of the step motors to drive the respective transmission devices in moving the respective correction devices, the correction devices will be unable to push the bill toward each other subject to "step loss" of the step motors. As soon as the pulse signal inputted into the step motors by the control circuit reaches the predetermined number of steps, the step motors are controlled to rotate the transmission devices in the reversed directions, moving the correction devices in direction away from each other, and the bill-pressing roller set of the bill transmission mechanism is returned to press the bill, enabling the bill to be transferred to the bill validation unit for validation. Thus, the bill acceptor in accordance with the present invention eliminates the drawback of complicated circuit design and high cost of the prior art bill acceptor that drives motors to move to clamping arms in correcting the angular position of the bill only after sensors of an alignment correction unit detected the width of the bill and its direction of deviation.

Further, if a user inserts a bill into the bill slot in a left lateral offset or right lateral offset manner, one transmission device of the alignment correction unit drives the associating correction device to push one lateral side (the left side) of the bill. At this time, the resistance received by the correction device from the bill is smaller than the thrust force applied by the correction device to the bill, and the correction device can push the bill toward the other correction device. When the other correction device touches the other lateral side (the right side) of the bill, the bill is corrected into accurate alignment with the center line of the bill passage. Thus, the invention is suitable for correcting different bills having different widths.

DETAILED DESCRIPTION OF THE PREFERRED EMBODIMENT

Referring to FIGS. 1-7, a bill acceptor is shown comprising a housing 1, and a bill-receiving unit 2. The housing 1 comprises a face panel 11 defining a bill slot 111. The bill-receiving unit 2 is accommodated in the housing 1, defining a bill passage 20 in communication with the bill slot 111 of the housing 1.

Further, the bill-receiving unit 2 comprises a bill transmission mechanism 21, an alignment correction unit 22, a sensor unit 23, a bill validation unit 24, and a bill box 25. The bill transmission mechanism 21, the alignment correction unit 22, the sensor unit 23 and the bill validation unit 24 are installed in the bill passage 20. The bill box 25 is located at the rear side of the bill passage 20 remote from the bill slot 111. The bill transmission mechanism 21 comprises at least one drive unit 211, at least one bill-transfer roller set 212, and at least one bill-pressing roller set 213. The at least one drive unit 211 comprises a plurality of transmission gears 2111 each having a respective gear shaft 2110. The at least one bill-transfer roller set 212 comprises a plurality of rollers 2121 respectively mounted at the gear shafts 2110 of the transmission gears 2111. The at least one bill-pressing roller set 213 is disposed in the bill passage 20 at a top side opposite to the at least one bill-transfer roller set 212, each comprising a rotating shaft 2131, a solenoid valve 2132 controllable to rotate the rotating shaft 2131 within a predetermined angle, and bill-pressing rollers 2133 coupled to the rotating shaft 2131 and respectively disposed at opposite front and rear sides relative to the solenoid valve 2131 and movable with the rotating shaft 2131 to press or release a bill 3 (see FIGS. 8-11).

Figure 3:
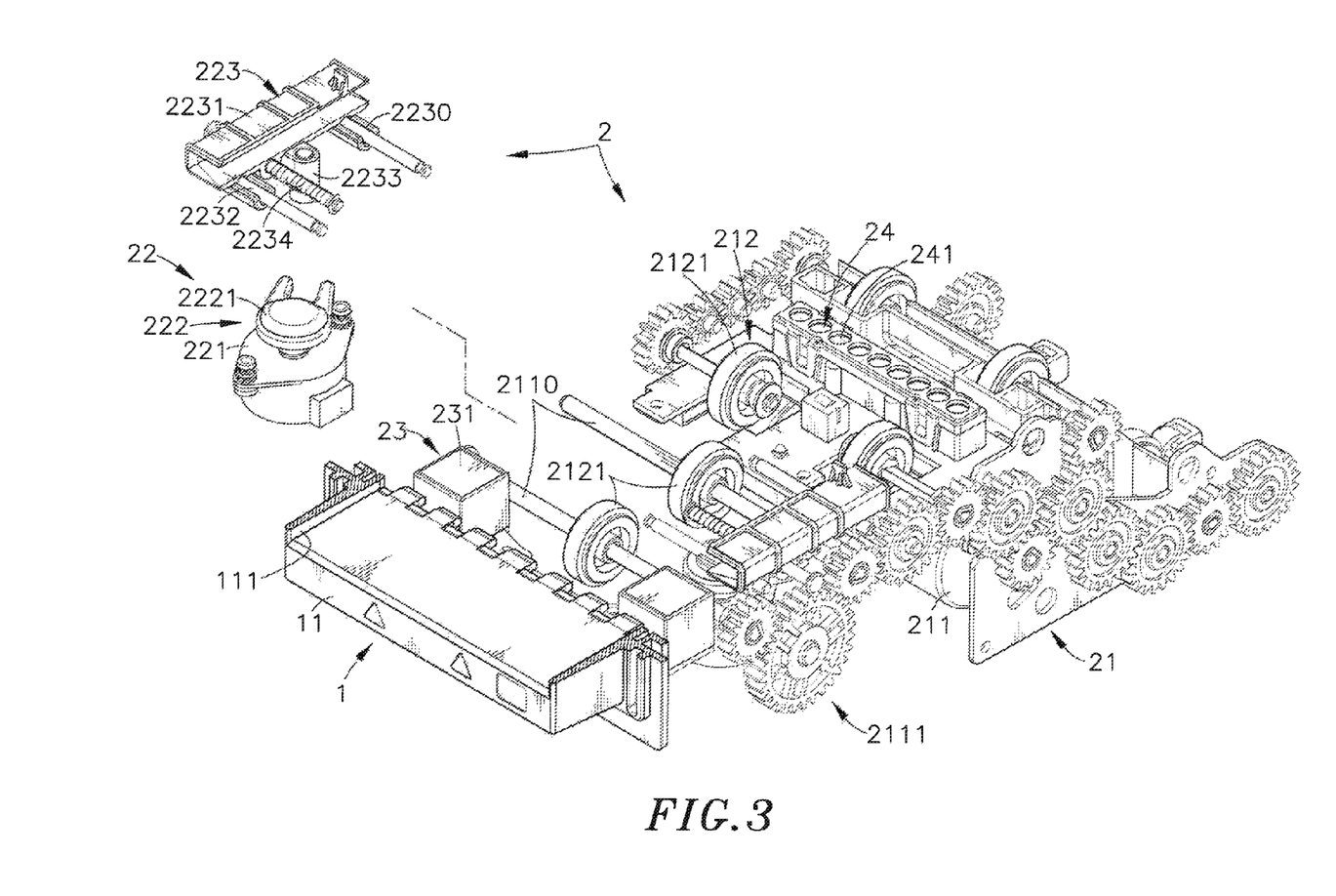
FIG. 3 is an exploded view of a part of the bill acceptor shown in FIG. 2.

The alignment correction unit 22 comprises at least one, for example, two step motors 221 each having an output shaft 2210, a transmission device 222 formed of a swivel member 2221 (or transmission gear train) and coupled to the output shaft 2210 of each respective step motor 221, and a correction device 223 coupled to the swivel member 2221 of each transmission device 222. The correction device 223 comprises a substantially U-shaped clamping arm 2231, two sliding axle holes 2230 bilaterally disposed at the bottom side of the U-shaped clamping arm 2231, two sliding rods 2232 respectively slidably coupled to the sliding axle holes 2230, a link 2233 spaced between the two sliding axle holes 2230 and coupled to the swivel member 2221 of one respective transmission device 222 for enabling the U-shaped clamping arm 2231 to be biased inward or outward by the swivel member 2221 of one respective transmission device 222, and an elastic member 2234 compressible by the U-shaped clamping arm 2231. Thus, the step motor 221 can drive the associating transmission device 222 to move the associating correction device 223 inward or outward, adjusting the width of the bill passage 20.

The sensor unit 23 comprises a control circuit 230 made in the form of a circuit board, and a plurality of sensor components 231 installed in the control circuit 230 for sensing the presence of a bill 3 in the bill passage 20 and controlling the at least one drive unit 211 of the bill transmission mechanism 21 to drive the at least one bill-transfer roller set 212 in transferring the bill 3 to the bill validation unit 24. The bill validation unit 24 comprises a plurality of sampling and recognition module 241 formed of photo transmitters and photo receivers and installed in the control circuit 230, and adapted to validate the authenticity and value of the bill 3. The bill box 25 comprises a box body 252, and a bill presser 251 adapted to press each validated true bill 3 into the box body 252.

Figure 4:
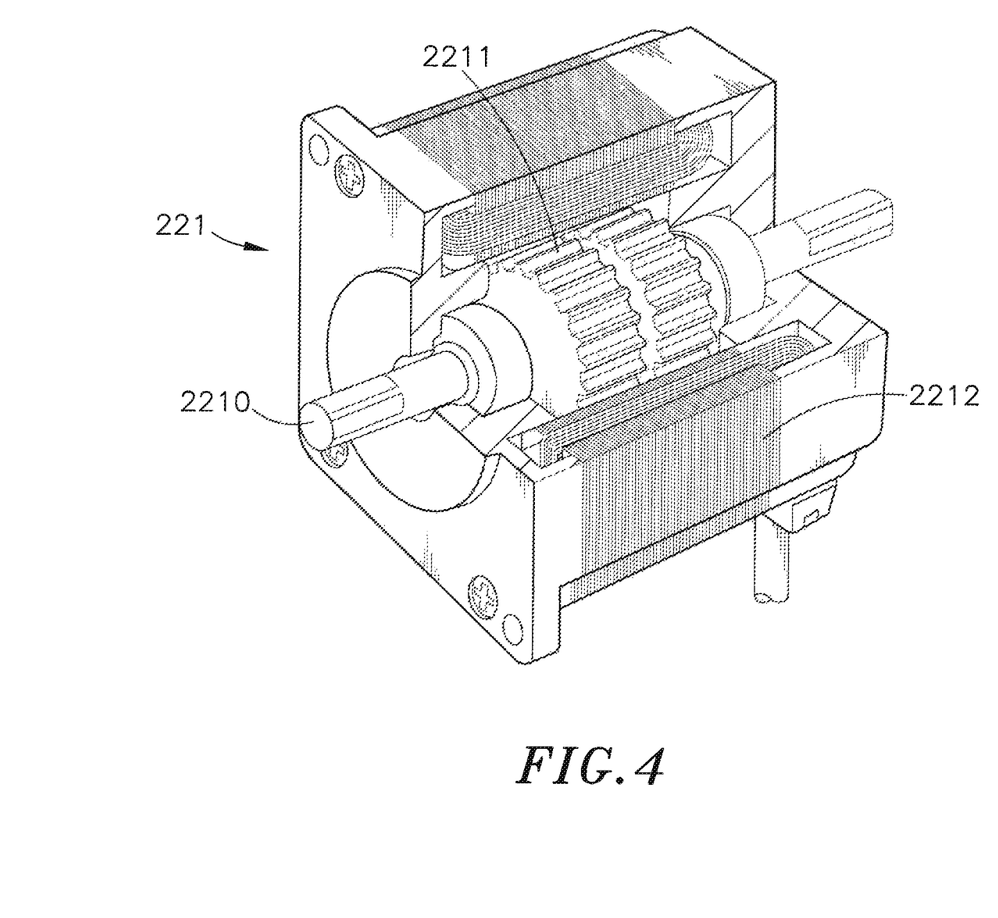
FIG. 4 is a cutaway view of a part of the step motors of the alignment correction unit of the bill acceptor shown in FIG. 2.
Figure 5:
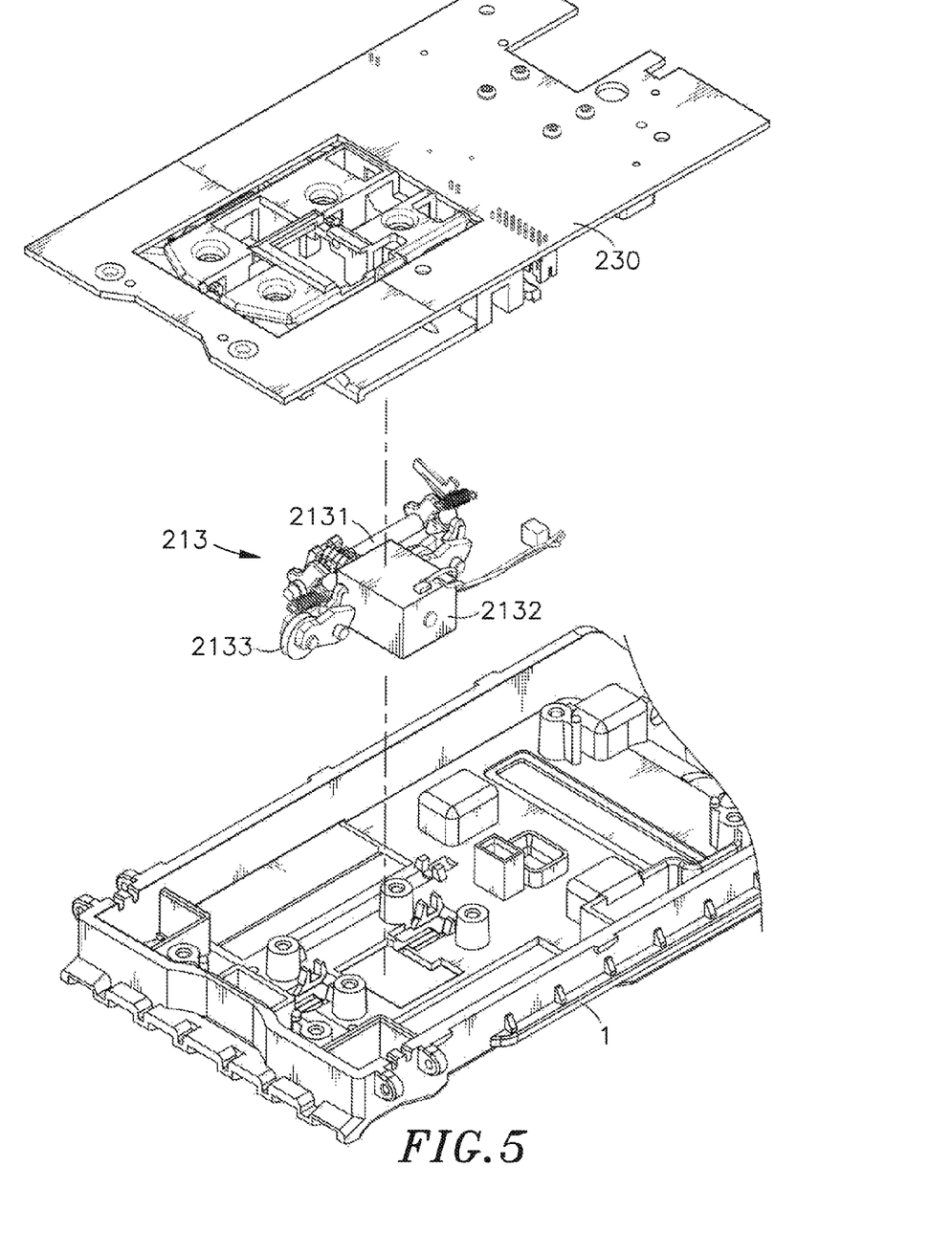
FIG. 5 is an exploded view of a part of the bill acceptor shown in FIG. 2, illustrating the arrangement of the bill-pressing roller set.
Figure 6:
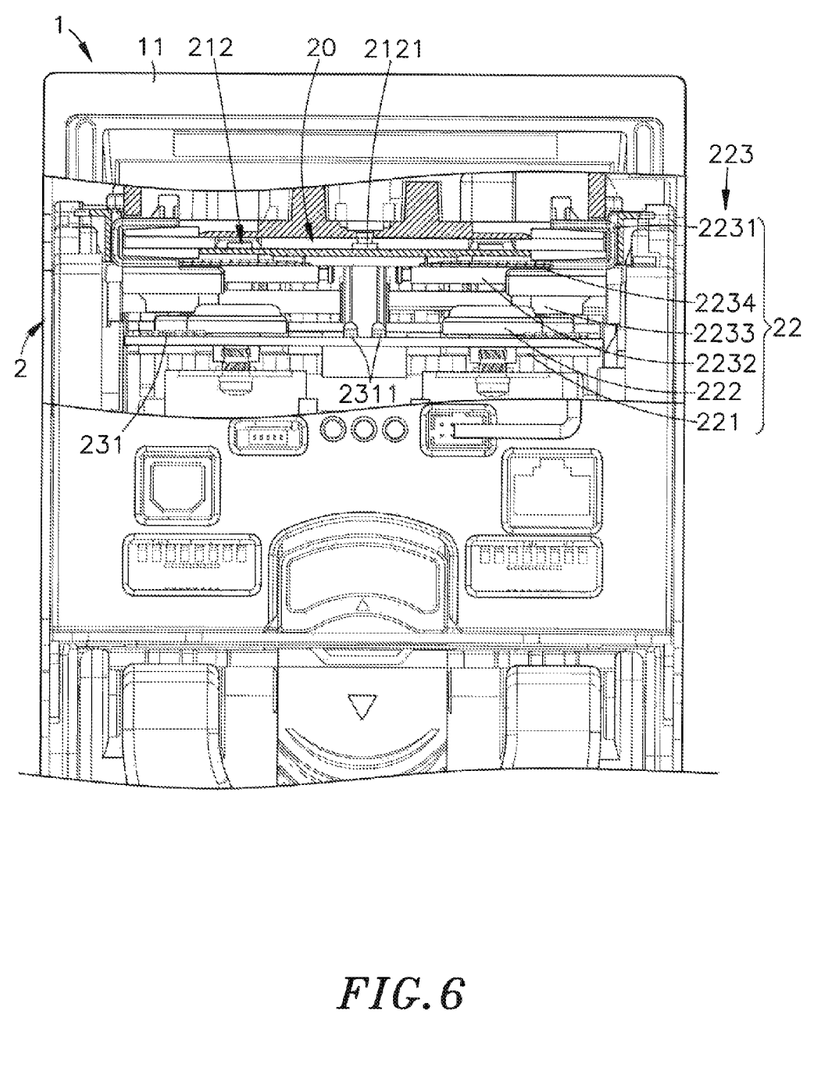
FIG. 6 is a schematic sectional front view of the bill acceptor shown in FIG. 2.
Figure 7:
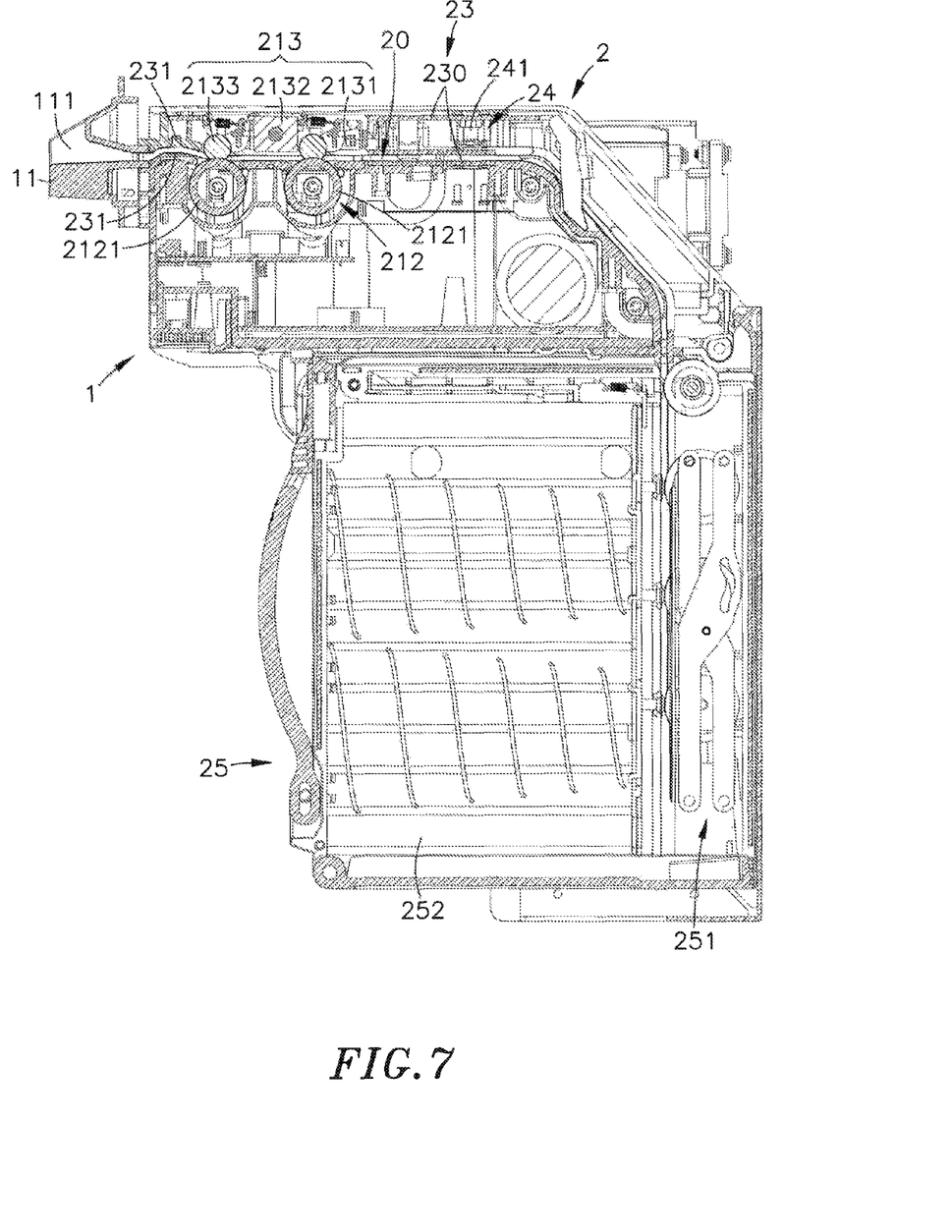
FIG. 7 is a schematic sectional side view of the bill acceptor shown in FIG. 2.
Figure 8:
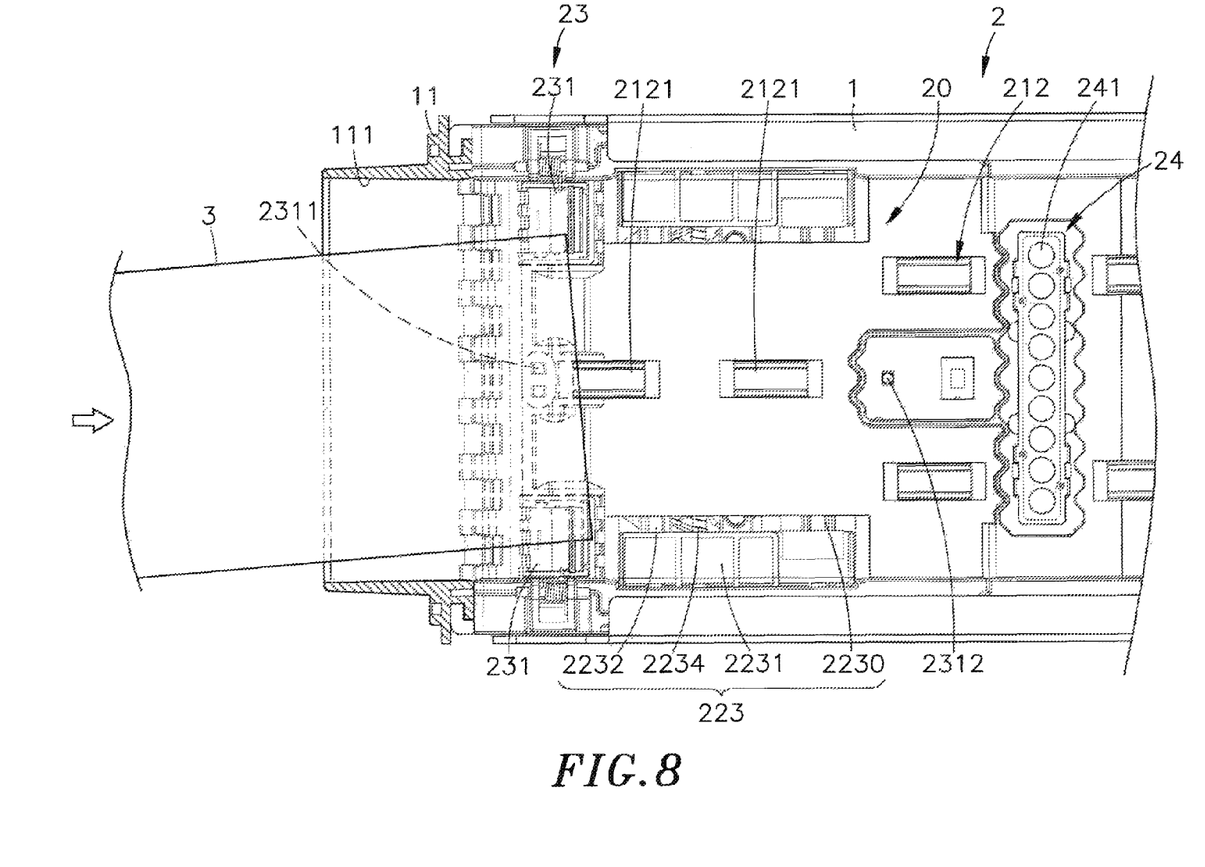
FIG. 8 is a schematic top view illustrating a bill inserted into the bill slot in a left lateral offset manner in accordance with the present invention.
Figure 9:
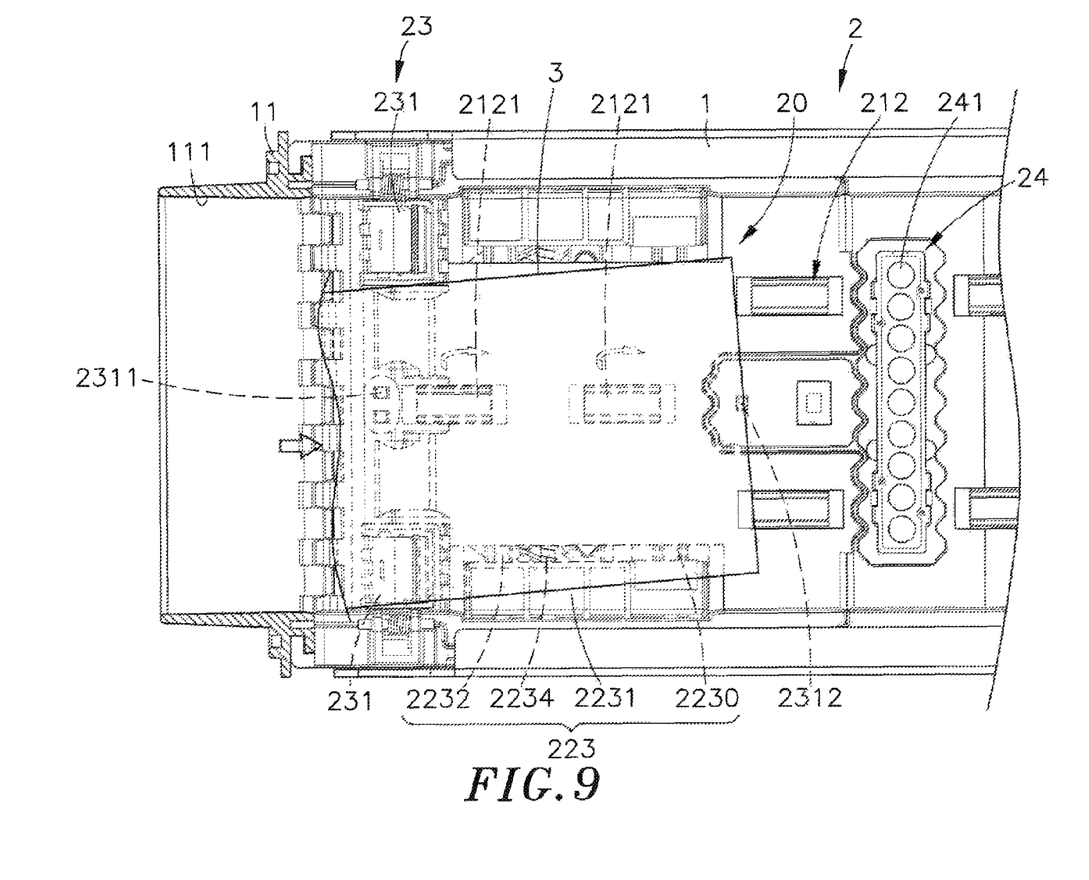
FIG. 9 corresponds to FIG. 8, illustrating the bill transferred into the bill passage.
Figure 10:
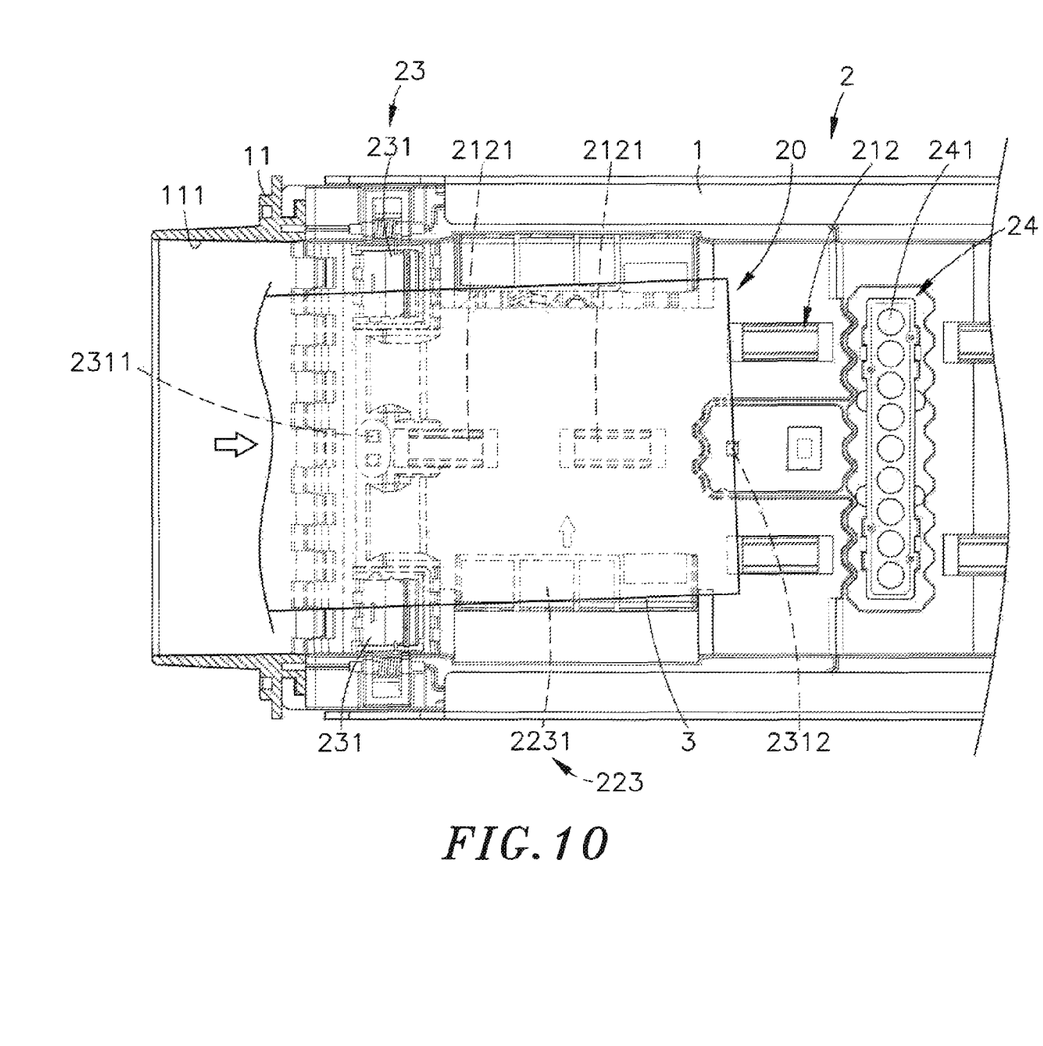
FIG. 10 corresponds to FIG. 9, illustrating the position of the bill under correction.
Figure 11:
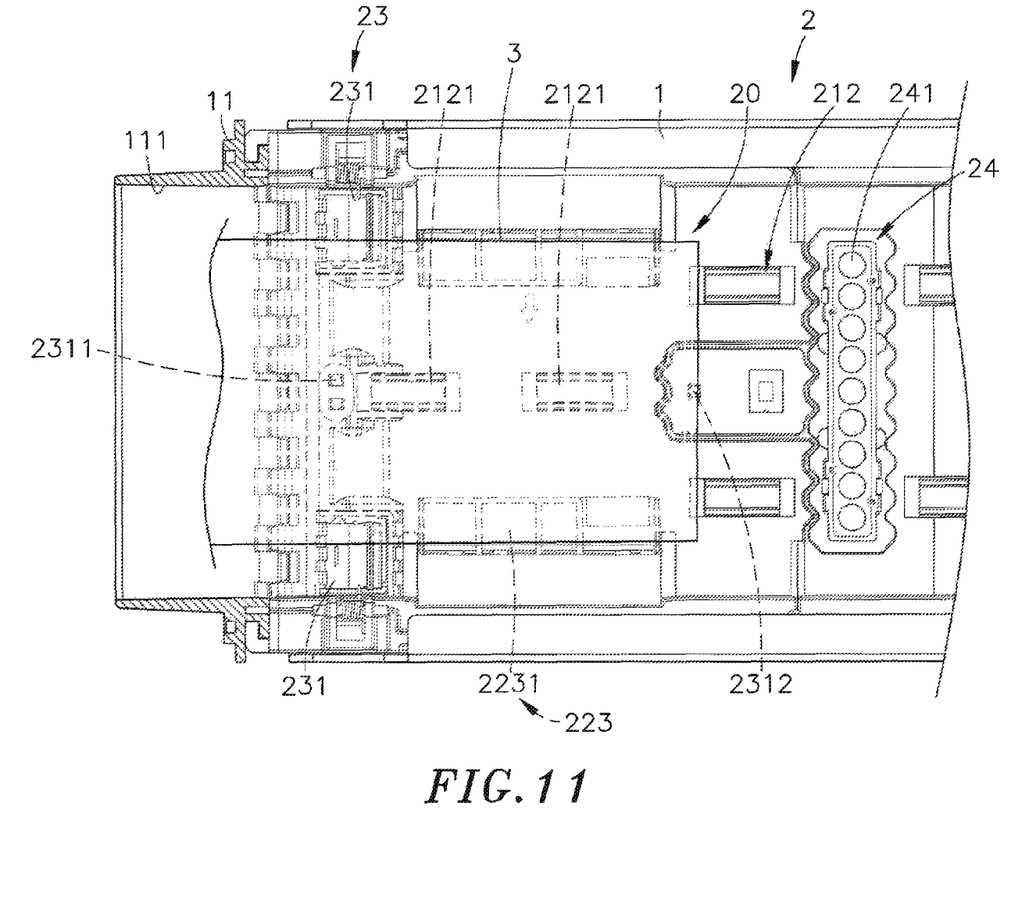
FIG. 11 corresponds to FIG. 10 illustrating the position of the bill corrected into accurate alignment with the center line of the bill passage.

Further, each step motor 221 of the alignment correction unit 22 comprises a gear-shaped rotor 2211, a stator 2212 surrounding the gear-shaped rotor 2211, and an output shaft 2210 connected to the gear-shaped rotor 2211. The two gear-shaped rotors 2211 provide an N pole or an S pole in the direction of the associating output shaft 2210 when magnetically excited. Further, the stator 2212 of each step motor 221 has a winding (not shown) wound thereon. The driver (not shown) of the control circuit 230 outputs the desired pulse signal to the stator 2212 of each step motor 221 to control switching of the excitation. By means of controlling the switched current that passes through the winding of the stator 2212 of each step motor 221, the polarity of the respective stator 2212 is relatively controlled, and thus, the phase of excitation can be properly switched, controlling the number of steps of the respective step motor 221 to be equal to 360°/(number of windings×number of poles of the gear-shaped rotor 2211). Thus, controlling the number of input pulse signals can control the angle of rotation of the respective step motor 221.

Further, the step motors 221 have the operating characteristics of "speed loss" and "step loss". "Speed loss" occurs due to that the revolving speed of the gear-shaped rotor 2211 of the respective step motor 221 cannot keep up with the speed of excitation of the stator 2212. When this problem occurs, the gear-shaped rotor 2211 is stopped while the winding at the stator 2212 is continuously excited. However, because the stator 2212 is excited subject to pulse signals, the winding will not burn out at this time. "Step loss" occurs due to that the step motor 221 cannot be synchronized with the pulses upon a sudden speed change or overload. Further, because the output torque is inversely proportional to the speed, drop of torque cannot bear the load, resulting in a slight slippage. Losing synchronization between the step motor and the pulse is called "step loss".

The bill position correction method of the invention can be used in the aforesaid bill acceptor. In actual application, this bill position correction method can also be applied to an automatic vending machine, game console, or any consumer system that sells commodities or provides services. The aforesaid bill acceptor can also be used in any automatic vending machine, game console or consumer system. During application, the housing 1 of the bill acceptor is mounted in the housing of the automatic vending machine, game console or consumer system. After installation, the control circuit 230 of the sensor unit 23 of the bill-receiving unit 2 is electrically connected to the control circuit of the automatic vending machine, game console or consumer system. During operation of the automatic vending machine, game console or consumer system, the bill validation unit 24 can validate the authenticity and value of each inserted bill 3.

Figure 1:
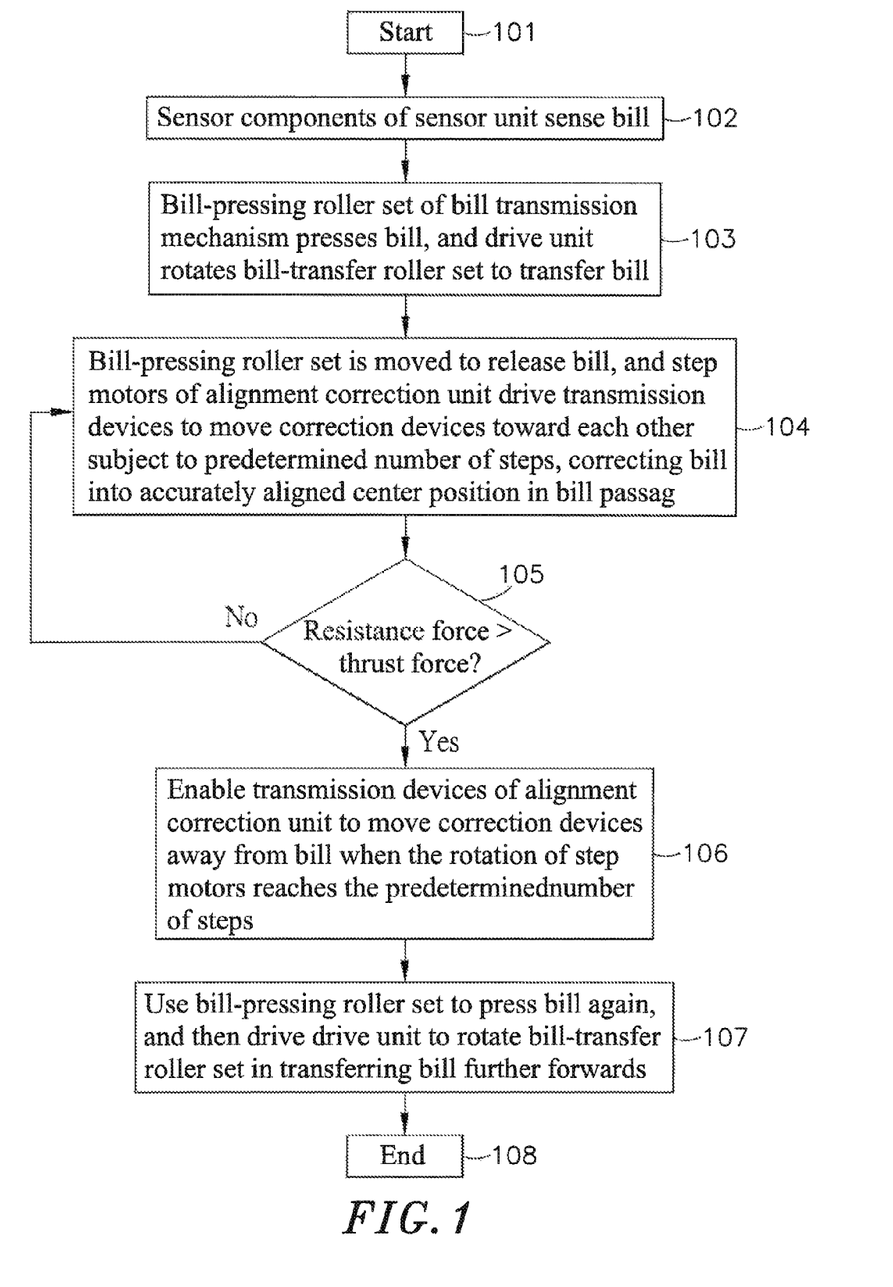
FIG. 1 is a flow chart of a bill position correction method in accordance with the present invention.
Figure 2:
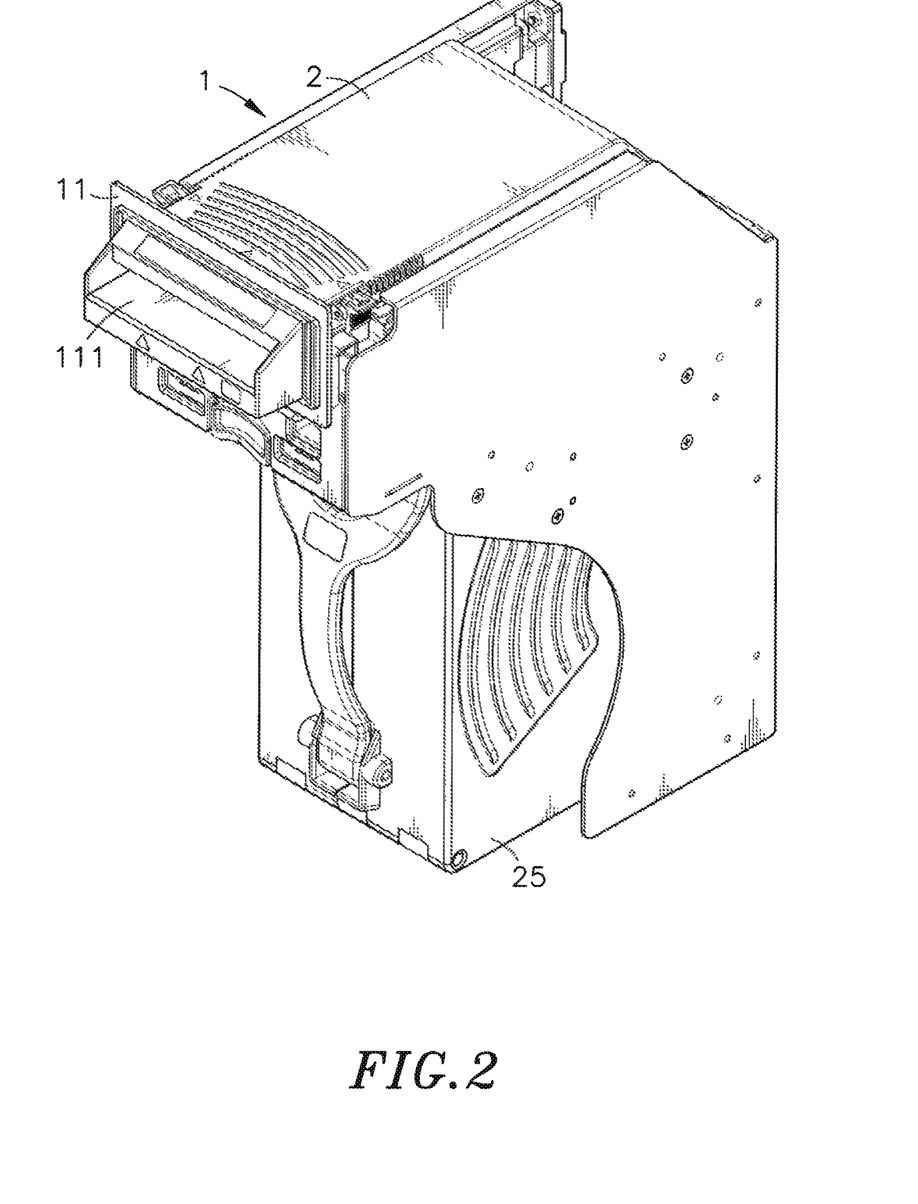
FIG. 2 is an elevational view of a bill acceptor using the bill position correction method in accordance with the present invention.

The bill position correction method is performed subject to the following procedures:

(101) Start.
(102) The sensor components 231 of the sensor unit 23 sense the insertion of a bill 3 into the bill passage 20.
(103) The at least one bill-pressing roller set 213 of the bill transmission mechanism 21 presses the inserted bill 3, and the at least one drive unit 211 is controlled to drive the at least one bill-transfer roller set 212, transferring the inserted bill 3 forwards to a predetermined location.
(104) The bill-pressing roller set 213 of the bill transmission mechanism 21 is moved to release the inserted bill 3 and at least one step motor 221 of the alignment correction unit 22 drives the at least one transmission device 222 to move the two correction devices 223 toward each other subject to a predetermined number of steps, correcting the bill 3 into accurately aligned center position in the bill passage 20.
(105) Determine whether or not the resistance force from the bill 3 at the correction devices 223 is larger than the thrust force from the at least one transmission device 222 of the at least one step motor 221? Then return to step (104) is negative, or proceed to step (106) if positive.
(106) Utilize the loss step status of the at least one step motor 221 to be unable to transfer the bill 3 forwards, and then control the at least one step motor 221 of the alignment correction unit 22 to drive the at least one transmission device 222, returning the two correction devices 223 to their former position.
(107) Use the bill-pressing roller set to press the bill 3 again, and then drive the at least one drive unit 211 to rotate the at least one bill-transfer roller set 212 in transferring the bill 3 further forwards.
(108) End.

As stated above, when a user inserts a bill 3 through the bill slot 111 of the face panel 11 of the housing 1 into the bill passage 20 of the bill-receiving unit 2, the sensor components 231 of the sensor unit 23 detect the presence of the bill 3. At this time, the at least one solenoid valve 2132 of the bill-pressing roller set 213 is controlled to rotate the rotating shaft 2131, moving the bill-pressing rollers 2133 to press the bill 3, enabling the bill 3 to be transferred by the rollers 2121 of the bill-transfer roller set 212 to the bill validation unit 24 subject to the operation of the drive unit 211 of the bill transmission mechanism 21. Thus, the sampling and recognition module 241 of the bill validation unit 24 is controlled by the control circuit 230 to validate the authenticity and value of the bill 3. If the bill 3 is recognized to be a true bill after validation by the sampling and recognition module 241 of the bill validation unit 24, the bill 3 will be transferred to the bill box 25, and pressed into the box body 252 by the bill presser 251. If the bill 3 is recognized to be a counterfeit bill, it will be returned to the bill slot 111 of the face panel 11.

Referring to FIGS. 8-11 again, a schematic top view of the invention illustrating a bill inserted into the bill passage in a lateral offset manner, a schematic top view of the invention illustrating before correction of the position of the inserted bill, a schematic top view of the invention during correction of the position of the inserted bill and a schematic top view of the invention illustrating the position of the inserted bill corrected are shown. As illustrated, if a user inserts a bill 3 into the bill slot 111 in a left lateral offset or right lateral offset manner, the sensor components 231 of the sensor unit 23 that are arranged adjacent to the bill slot 111 can detect the width and offset direction of the bill 3. At this time, the at least one drive unit 211 of the bill transmission mechanism 21 drives the at least one bill-transfer roller set 212 to transfer the bill 3 to the bill validation unit 24. When the sensor components 231 adjacent to the bill validation unit 24 are triggered by the approaching bill 3, the at least one drive unit 211 is stopped, keeping the bill 3 in between the two correction devices 223 of the alignment correction unit 22. Thereafter, the control circuit 230 controls the step motors 221 of the alignment correction unit 22 to rotate, and each solenoid valve 2132 of the at least one bill-pressing roller set 213 is driven to rotate the respective rotating shaft 2131 to move the respective bill-pressing roller 2133 upward to release the bill 3.

At this time, the control circuit 230 of the sensor unit 23 controls the at least one step motor 221 of the alignment correction unit 22 to rotate the at least one transmission device 222 subject to a predetermined number of steps, moving the correction devices 223 toward each other. In this embodiment, two step motors 221 are controlled to rotate one respective transmission device 222 in moving one respective correction device 223. When moving the two correction devices 223 toward each other, the U-shaped clamping arms 2231 of the two correction devices 223 are moved to adjust the width of the bill passage 20, correcting the moving direction of the bill 3 into accurate alignment with the center line of the bill passage 20. Because the predetermined number of steps of the rotation of the step motors 221 controlled by the control circuit 230 is a constant value, the control circuit 230 can control the two step motors 221 to rotate the transmission devices 222 in moving the respective correction devices 223 to correct the moving direction of any kind of inserted true bills 3 into accurate alignment with the center line of the bill path 20.

Further, when controlling the alignment correction unit 22 to correct the moving direction of the offset bill 3, the step motors 221 keep rotating. At this time, the U-shaped clamping arm 2231 of one correction device 223 will push one lateral side, for example, the left side of the offset bill 3. Because the resistance force from the left side of the offset bill 3 is smaller than the thrust force produced during rotation of the respective step motor 221 to drive the respective transmission device 222 in moving the respective correction device 223, the correction device 223 can push the bill 3 in direction toward the other correction device 223 to the extent where the U-shaped clamping arm 2231 of the other correction device 223 touches the other lateral side, i.e., the right side of the bill 3, and thus, the U-shaped clamping arms 2231 of the two correction devices 223 are respectively kept in contact with the opposing left and right sides of the bill 3. At this time, if the resistance force received by the two correction devices 223 from the bill 3 is larger than the thrust force (normally 4~8 g) produced during rotation of the step motors 221 to drive the respective transmission devices 222 in moving the respective correction devices 223, the two correction devices 223 will be unable to push the bill 3 inwardly subject to "step loss" of the step motors 221. As soon as the pulse signal inputted into the step motors 221 by the driver of the control circuit 230 reaches the predetermined number of steps, the step motors 221 are controlled to rotate the transmission devices 222 in the reversed directions, moving the respective correction devices 223 in direction away from each other, and the at least one bill-pressing roller set 213 of the bill transmission mechanism 21 is returned to press the bill 3, enabling the bill 3 to be transferred to the bill validation unit 24 by the at least one drive unit 211 via the at least one bill-transfer roller set 212 where the sampling and recognition module 241 can validate the authenticity and value of the position-corrected bill 3. After recognition, the true bill 3 is then transferred to the bill box 25.

As stated above, the invention uses the step motors 221 of the alignment correction unit 22 to drive the respective transmission devices 222 in moving the respective correction devices 223 to push the inserted bill into accurate alignment with the center line of the bill passage 20. If the resistance force received by the correction devices 223 from the bill 3 is larger than the thrust force produced during rotation of the step motors 221 to drive the respective transmission devices 222 in moving the respective correction devices 223, the correction devices 223 will be unable to push the bill 3 inwardly subject to "step loss" of the step motors 221. When the pulse signal inputted into the step motors 221 by the driver of the control circuit 230 reaches the predetermined number of steps, the step motors 221 will be reversed, driving the transmission devices 222 to move the correction devices 223 in direction away from each other. By means of utilizing the characteristic of "step loss" of the step motors 221, the transmission devices 222 can be accurately controlled to move the correction devices 223 toward each other, correcting the moving direction of any kind of bill 3 of any width into accurate alignment with the center line of the bill passage 20. Thus, the invention effectively eliminates the drawbacks of complicated circuit design of the arrangement of control circuit and sensors and high installation cost of the prior art design, i.e., the bill acceptor in accordance with the present invention has the advantages of simple structure, ease of operation and low cost.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A bill position correction method used in a bill acceptor comprising a housing defining a bill slot for the insertion of a bill and a bill-receiving unit accommodated in said housing and defining a bill passage in communication with said bill slot, said bill-receiving unit comprising a bill box for collecting bills, a bill transmission mechanism, said bill transmission mechanism comprising at least one drive unit, at least one bill-transfer roller set rotatable by said at least one drive unit to transfer a bill and a bill-pressing roller set controllable to press each inserted bill, an alignment correction unit formed of at least one step motor, at least one transmission device and two correction devices and adapted for correcting the moving direction of each inserted bill into accurate alignment with a center line of said bill passage, and a sensor unit, said sensor unit comprising a control circuit and a set of sensor components, the bill position correction method comprising the steps of:
 (a) starting up said bill acceptor;
 (b) enabling said sensor components of said sensor unit to sense the insertion of a bill through said bill slot into said bill passage;
 (c) enabling said at least one bill-pressing roller set of said bill transmission mechanism to press said bill and said at least one bill-transfer roller set to transfer said bill to a predetermined location in said bill passage;
 (d) moving the bill-pressing roller set of the bill transmission mechanism to release the inserted bill and enabling said at least one step motor of said alignment correction unit to move said two correction devices toward each other in correcting said bill into accurate alignment with the center line of said bill passage subject to a predetermined number of steps;
 (e) determining the resistance force received by said two correction devices from said bill to be larger or smaller than the thrust force produced during rotation of said at least one step motor to drive said at least one transmission device in moving said correction devices, and then returning to step (d) if said resistance force is larger than said thrust force, or proceeding to step (f) if said resistance force is smaller than said thrust force;
 (f) utilizing the step loss status of said at least one step motor to be unable to keep pushing said bill, and then enabling said at least one transmission device of said alignment correction unit to move said correction devices away from said bill when the rotation of said at least one step motor reaches said predetermined number of steps;
 (g) enabling said at least one bill-pressing roller set of said bill transmission mechanism to press said bill again, and then enabling said at least one bill-transfer roller set to transfer said bill; and
 (h) ending.

2. The bill position correction method as claimed in claim 1, wherein said at least one drive unit of said bill transmission mechanism comprises a plurality of transmission gears each having a respective gear shaft; said at least one bill-transfer roller set comprises a plurality of rollers respectively mounted at said gear shafts of said transmission gears said at least one drive unit of said bill transmission mechanism and rotatable to transfer said bill.

3. The bill position correction method as claimed in claim 1, wherein said at least one bill-pressing roller set each comprises a rotating shaft, a solenoid valve controllable to rotate said rotating shaft within a predetermined angle, and a plurality of bill-pressing rollers coupled to said rotating shaft and respectively disposed at opposite front and rear sides relative to said solenoid valve and movable with said rotating shaft to press or release said bill.

4. The bill position correction method as claimed in claim 1, wherein each said step motor comprises an output shaft; said at least one transmission device of said alignment correction unit comprises at least one swivel member respectively coupled between the output shafts of said step motor and said correction devices; each said correction device comprises a substantially U-shaped clamping arm, two sliding axle holes bilaterally disposed at a bottom side of said U-shaped clamping arm, two sliding rods respectively slidably coupled to said sliding axle holes, and a link spaced between said two sliding axle holes and coupled to said at least one swivel member of said at least one transmission device for enabling said U-shaped clamping arm to be biased inward or outward by said at least one swivel member of said at least one transmission device.

5. The bill position correction method as claimed in claim 1, wherein said sensor components of sensor unit are installed in said control circuit and adapted for controlling the operation of said bill transmission mechanism and said alignment correction unit when sensing movement of said bill in said bill passage.

6. The bill position correction method as claimed in claim 1, wherein said bill acceptor further comprises a bill validation unit installed in said bill passage and adapted for validating the authenticity and value of said bill, and a bill box located at a rear side of said bill passage remote from said bill slot, said bill box comprising a box body and a bill presser adapted to press said bill into said box body.

* * * * *